US011212873B2

United States Patent
Chang

(10) Patent No.: US 11,212,873 B2
(45) Date of Patent: Dec. 28, 2021

(54) RELAYING OF BROADCAST/MULTICAST DELIVERY FROM A RELAY UE TO A REMOTE UE

(71) Applicant: Kyocera Corporation, Kyoto (JP)

(72) Inventor: Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 21 days.

(21) Appl. No.: 16/609,424

(22) PCT Filed: May 3, 2018

(86) PCT No.: PCT/US2018/030957
§ 371 (c)(1),
(2) Date: Oct. 29, 2019

(87) PCT Pub. No.: WO2018/204695
PCT Pub. Date: Nov. 8, 2018

(65) Prior Publication Data
US 2020/0100325 A1  Mar. 26, 2020

Related U.S. Application Data

(60) Provisional application No. 62/502,155, filed on May 5, 2017, provisional application No. 62/642,182, filed on Mar. 13, 2018.

(51) Int. Cl.
*H04W 88/04* (2009.01)
*H04W 76/14* (2018.01)
(Continued)

(52) U.S. Cl.
CPC .............. *H04W 88/04* (2013.01); *H04W 4/06* (2013.01); *H04W 72/005* (2013.01); *H04W 76/14* (2018.02); *H04W 76/27* (2018.02)

(58) Field of Classification Search
None
See application file for complete search history.

(56) References Cited

U.S. PATENT DOCUMENTS 10,623,920 B2   4/2020  Futaki
10,735,912 B2   8/2020  Adachi et al.
(Continued)

FOREIGN PATENT DOCUMENTS

| WO | 2016-186414 A1 | 11/2016 |
| WO | 2017026408 A1  | 2/2017  |
| WO | 2017046978 A1  | 3/2017  |

OTHER PUBLICATIONS

Huawei, Hi-Silicon; "Remaining issues for ProSe UE-to-network relay procedure," R2-156525; 3GPP TSG-RAN WG2 #92; Nov. 7, 2015; Anaheim, US.
(Continued)

*Primary Examiner* — Saumit Shah

(57) ABSTRACT

A relay user equipment (UE) device transmits, to a base station, a first Multimedia Broadcast Multicast Service (MBMS) Interest Indication message, which includes information indicating that the relay UE device is operating in a relay mode on behalf of a remote UE device. In response to the MBMS Interest Indication message, the base station provides broadcast/multicast information to the remote UE device via the relay UE device. In some cases, control information is provided to the remote UE device via the relay UE device. In other cases, an MBMS service of interest is provided to the remote UE device via the relay device. The manner in which the broadcast/multicast information is delivered can be determined by the remote UE device or the relay UE device.

21 Claims, 4 Drawing Sheets

(51) Int. Cl.
    *H04W 76/27*    (2018.01)
    *H04W 4/06*     (2009.01)
    *H04W 72/00*    (2009.01)

(56) References Cited

U.S. PATENT DOCUMENTS

| | | |
|---|---|---|
| 2016/0165412 A1 | 6/2016 | Lee et al. |
| 2016/0338095 A1 | 11/2016 | Faurie et al. |
| 2017/0041752 A1 | 2/2017 | Baek et al. |
| 2018/0077618 A1* | 3/2018 | Lee ................ H04W 40/22 |
| 2018/0295671 A1* | 10/2018 | Kim ................ H04W 88/04 |
| 2018/0343556 A1* | 11/2018 | Wang .............. H04W 72/0406 |
| 2020/0404472 A1* | 12/2020 | Watfa ............. H04W 4/08 |

OTHER PUBLICATIONS

Potevio; "Some consideration of RSU," R2-161648; 3GPP TSG-RAN WG2 #93; Feb. 6, 2016; St. Julian's, MT.

\* cited by examiner

RELAYING OF BROADCAST/MULTICAST DELIVERY FROM A RELAY UE TO A REMOTE UE

CLAIM OF PRIORITY

The present application claims priority to Provisional Application No. 62/502,155, filed May 5, 2017, and Provisional Application No. 62/642,182 filed Mar. 13, 2018, both entitled "RELAYING OF BROADCAST/MULTICAST DELIVERY FROM A RELAY UE TO A REMOTE UE", assigned to the assignee hereof.

FIELD

This invention generally relates to wireless communications and more particularly to relaying broadcast/multicast information to a remote user equipment device.

BACKGROUND

There is a lot of interest in integrating low cost Machine Type Communications (MTC) devices within Long-Term Evolution (LTE) networks. An MTC device is a device capable of communicating with other devices without requiring human interaction. One important example of a low cost MTC device is a wearable device such as a smart watch. Due to the common usage pattern of the smart watch within a close proximity to the user's smartphone, the smart watch and the smartphone can utilize MTC to communicate with each other. However, the small form-factor of many MTC devices can limit the battery size and reception circuitry that can be utilized within the MTC devices, which creates challenges for integrating the MTC devices within an LTE network.

SUMMARY

A relay user equipment (UE) device transmits, to a base station, a first Multimedia Broadcast Multicast Service (MBMS) Interest Indication message, which includes information indicating that the relay UE device is operating in a relay mode on behalf of a remote UE device. In response to the MBMS Interest Indication message, the base station provides broadcast/multicast information to the remote UE device via the relay UE device. In some cases, control information is provided to the remote UE device via the relay UE device. In other cases, an MBMS service of interest is provided to the remote UE device via the relay device. The manner in which the broadcast/multicast information is delivered can be determined by the remote UE device or the relay UE device.

DETAILED DESCRIPTION

Figure 1:
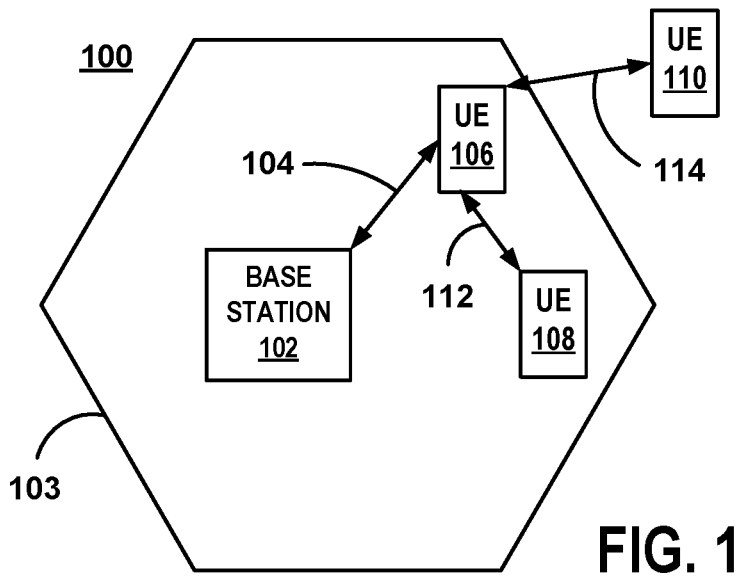
FIG. 1 is a block diagram of a communication system for an example in which a relay user equipment (UE) device relays broadcast/multicast information to a remote UE device.

There is a lot of interest to use 3rd Generation Partnership Project (3GPP) Long-Term Evolution (LTE) technology to connect and manage low cost MTC (Machine Type Communications) devices. One important example of such low cost MTC devices are wearables, which also have the benefit of almost always being in close proximity to a smartphone that can serve as a relay between an LTE network and the wearable device.

In order to integrate the MTC devices with the LTE network, certain enhancements should be made in order to facilitate relaying information from the LTE network (e.g., a base station) to a remote user equipment (UE) device (e.g., a wearable) via a relay UE device. For example, user equipment-to-network relaying should be enhanced to support end-to-end (E2E) security through the relay link, service continuity, E2E Quality of Service (QoS) where possible, efficient operation with multiple remote user equipment (UE) devices, and efficient path switching between the Uu air interface, which links the UE device and the base station (eNB), and the Device-to-device (D2D) air interface. Relaying using D2D can also be based on non-3GPP technologies such as Bluetooth and Wi-Fi. Some enhancements, such as service continuity, can make relaying more attractive for such technologies in commercial use cases.

Relaying can be especially useful for wearables due to their usage patterns with proximity to the user's smartphone, as well as form-factor limitations that may make a direct Uu connection between the base station and the wearable less practical (e.g. due to limits on battery size of the wearable and space requirements for additional reception circuitry). Relaying can also enable significant power savings for remote UE devices that are getting their traffic relayed via a relay UE device. This is especially true for deep coverage scenarios.

One cost effective way to relay information to the remote UE device is to use unidirectional D2D links between remote UE devices and relay UE devices. In this case, the relay UE device is utilized to relay only uplink data from the remote UE device. The advantage of this approach is no additional radio frequency (RF) circuitry or capability for D2D reception is required by the remote UE device.

One of the services that need to be considered is for relaying SC-PTM (Single Cell-Point to Multipoint), or Broadcast/Multicast in general, from the relay UE device to the remote UE device. Broadcast/Multicast services have been earmarked as a potential area of growth in the future. SC-PTM uses the Evolved Multimedia Broadcast Multicast Service (eMBMS) system architecture, providing enhancements in the air interface to improve radio efficiency and to reduce latency.

SC-PTM supports broadcast/multicast services over a single cell, and the broadcast/multicast area can be dynamically adjusted cell by cell according to the distribution of users over a service area that may be covered by one or more cells. SC-PTM is especially suitable for scenarios where broadcast/multicast service is expected to be delivered to a limited number of cells due to user interests and where the concerned cells may dynamically change due to user movement. SC-PTM allows efficient radio utilization and flexible deployment of a number of applications (e.g., critical communications, traffic information for cars, on-demand television (TV) services, etc.).

SC-PTM transfers the broadcast/multicast services using the LTE Physical Downlink Shared Channel (PDSCH), and scheduling is performed using a common Group Radio Network Temporary Identifier (Group-RNTI) for a group of users. The SC-PTM scheduling is quite agile and radio resources could be dynamically assigned in time and frequency domain via the Physical Downlink Control Channel (PDCCH) based on real time traffic load on a Transmission Time Interval (TTI) by TTI basis. With single-cell transmission of Multimedia Broadcast Multicast Service (MBMS), the MBMS services are transmitted in the coverage area of a single cell, and one Single-Cell Multicast Control Channel (SC-MCCH) and one or more Single-Cell Multicast Traffic Channels (SC-MTCH) are mapped onto the Downlink Shared Channel (DL-SCH). Scheduling for the single-cell transmission of the MBMS services is performed by the base station (eNB) with assistance from the Multicast Control Entity (MCE), which is responsible for the MBMS session control. As with all existing broadcast mechanisms, including SC-PTM, the broadcast is not guaranteed to reach all UE devices to which the broadcast is transmitted within a particular coverage area or cell.

The challenges for the remote UE device to obtain SC-PTM delivery are numerous. Previously, it is assumed that a UE device interested in receiving SC-PTM traffic would inform its serving cell, via an MBMS Interest Indication message, regarding the UE device's interest so that the network will ensure that the UE device is in a cell where the indicated SC-PTM of interest may be received. This also assumed that the UE device can directly obtain the necessary System Information Blocks (e.g., SIB 3, SIB 15, SIB 20) required to receive the SC-PTM traffic. The UE device would also be expected to monitor SC-MCCH over the DL-SCH traffic channel to find out if the broadcast service of interest is available, and if so, the UE device would obtain the broadcast traffic over SC-PTM based on the configuration provided by the SC-MCCH.

However, a remote UE device may or may not be able to obtain the control information (e.g., SIBs and SC-MCCH) directly from the eNB, especially if the remote UE device is out-of-coverage of the serving cell. In this case, the relay UE device must provide the necessary information to the remote UE device so that the remote UE device can receive the SC-PTM delivery. This requirement is especially important for Public Safety since SC-PTM is one of the mechanisms used for Group Communication set forth in 3GPP Technical Specification 23.468 v12.4.0.

The examples described herein set forth the proper signaling protocols necessary for SC-PTM reception by the remote UE device. In some cases, the remote UE device is located within the coverage area (e.g., service area) of the base station and can receive the SC-PTM control information and/or the broadcasted content information (e.g., SC-PTM traffic) directly from the base station. In other cases, the remote UE device is in the out-of-coverage region, and thus, the remote UE device must rely on the relay UE device to deliver the SC-PTM control information as well as the broadcasted content information (e.g., SC-PTM traffic).

FIG. 1 is a block diagram of a communication system for an example in which a relay user equipment (UE) device relays broadcast/multicast information to a remote UE device. The communication system 100 is part of a radio access network (not shown) that provides various wireless services to UE devices that are located within the respective service areas of the various base stations that are part of the radio access network. The base station 102 provides wireless services to relay UE device 106, via communication link 104, which is located within service area 103 of the base station 102. The remote UE device 108 is located within the service area 103, and the remote UE device 110 is located outside of the service area 103.

In the example shown in FIG. 1, communication link 104 is a Uu link between the relay UE device 106 and the base station (eNB) 102. Communication link 104 is configured to provide downlink communication from the base station 102 to the relay UE device 106 and to provide uplink communication from the relay UE device 106 to the base station 102. Although not explicitly shown in FIG. 1, remote UE device 108 may also communicate directly with base station 102 via a communication link that is similar to communication link 104. Relay UE device 106 communicates with remote UE devices 108, 110 via communication links 112, 114, respectively. As will be discussed more fully below, communication links 112, 114 may represent 3GPP D2D links, non-3GPP D2D links, or both.

In the interest of clarity and brevity, communication system 100 is shown as having only one base station 102. However, in other examples, communication system 100 could have any suitable number of base stations. In the example shown in FIG. 1, base station 102 provides wireless services directly to relay UE device 106 and provides wireless services indirectly to remote UE devices 108, 110, via relay UE device 106. In other examples, UE device 108 may also receive wireless services directly from base station 102 via a communication link that is similar to communication link 104.

Base station 102, which is sometimes referred to as an eNodeB or eNB, communicates with the relay UE device 106 by transmitting downlink signals via communication link 104. Base station 102 also receives uplink signals transmitted from the relay UE device 106 via communication link 104. The UE devices 106, 108, 110 are any wireless communication devices such as mobile phones, transceiver modems, personal digital assistants (PDAs), tablets, Machine Type Communications (MTC) devices, and wearable devices, for example.

Figure 2A:
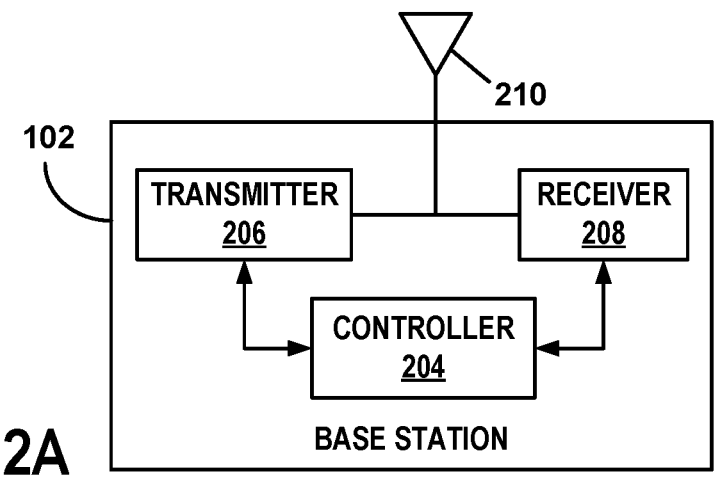
FIG. 2A is a block diagram of an example of the base station shown in FIG. 1.

Base station 102 is connected to the network through a backhaul (not shown) in accordance with known techniques. As shown in FIG. 2A, base station 102 comprises controller 204, transmitter 206, and receiver 208, as well as other electronics, hardware, and code. The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the downlink signals to be transmitted via communication link 104 and, in so doing, can apply any one of a plurality of modulation orders. The demodulator demodulates any uplink signals received at the base station 102 in accordance with one of a plurality of modulation orders.

Returning to FIG. 1, the communication system 100 provides various wireless services, directly or indirectly, to the UE devices 106, 108, 110 via base station 102. For the examples herein, the communication system 100 operates in accordance with at least one revision of the 3rd Generation Partnership Project Long Term Evolution (3GPP LTE) communication specification. In the example shown in FIG. 2B, the relay UE device 106 circuitry is configured to communicate directly with the base station 102 and is configured for 3GPP D2D communication with the remote UE devices 108, 110. For example, the relay UE device 106 receives downlink signals via communication link 104 using antenna 212 and receiver 214. The relay UE device 106 transmits (e.g., relays) information received from the base station 102 to remote UE device 108 and/or remote UE device 110 using transmitter 218 and antenna 212. The relay UE device 106 receives uplink signals from the remote UE device 108 and/or remote UE device 110 using antenna 212 and receiver 214. The relay UE device 106 transmits (e.g., relays) information received from the remote UE device 108 and/or remote UE device 110 to the base station 102 using transmitter 218 and antenna 212.

In the foregoing example, the same UE device circuitry and configuration that is shown for relay UE device 106 is also utilized for remote UE device 108 and/or remote UE device 110 (e.g., capable of 3GPP D2D communication with the relay UE device 106 and capable of direct communication with the base station 102). However, in other examples, remote UE device 108 and/or remote UE device 110 have circuitry that is configured for 3GPP D2D communication with the relay UE device 106 but is not configured for direct communication with the base station 102. In still other examples, remote UE device 108 and/or remote UE device 110 have circuitry that is configured for non-3GPP D2D communication (e.g., Bluetooth or Wi-Fi) with the relay UE device 106 but is not configured for direct communication with the base station 102. In still further examples, remote UE device 108 and/or remote UE device 110 have circuitry that is configured for both 3GPP D2D communication and non-3GPP D2D communication (e.g., Bluetooth or Wi-Fi) with the relay UE device 106. Obviously, for the examples in which the remote UE device 108 and/or remote UE device 110 have circuitry that is configured for non-3GPP D2D communication, the relay UE device 106 must also have circuitry that is configured for non-3GPP D2D communication.

Besides antenna 212 and receiver 214, the relay UE device 106 further comprises controller 216 and transmitter 218, as well as other electronics, hardware, and code. The relay UE device 106 is any fixed, mobile, or portable equipment that performs the functions described herein. The various functions and operations of the blocks described with reference to the relay UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters (e.g., a 3GPP transmitter and a non-3GPP transmitter). The receiver 214 includes electronics configured to receive wireless signals. In some situations, the receiver 214 may include multiple receivers (e.g., a 3GPP receiver and a non-3GPP receiver). The receiver 214 and transmitter 218 receive and transmit signals, respectively, through antenna 212. The antenna 212 may include separate transmit and receive antennas. In some circumstances, the antenna 212 may include multiple transmit and receive antennas.

Figure 2B:
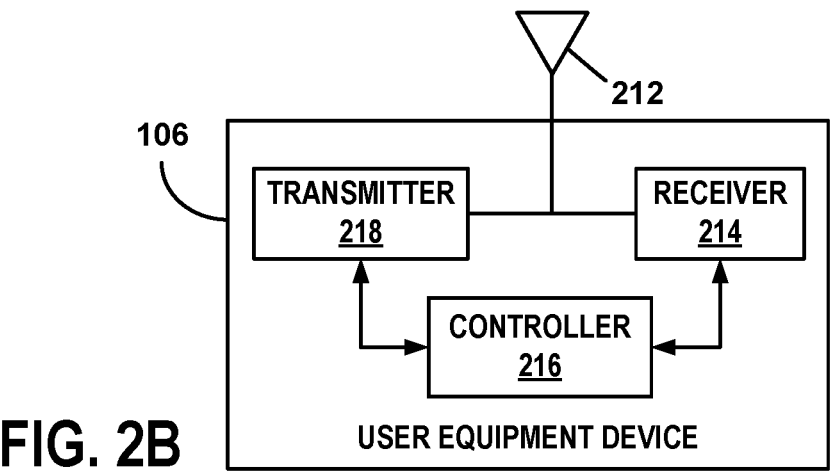
FIG. 2B is a block diagram of an example of the UE devices shown in FIG. 1.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate signals prior to transmission. The demodulator demodulates received signals in accordance with one of a plurality of modulation orders.

In operation, the need/desire to relay information to the remote UE device may arise when the remote UE device cannot receive the SC-PTM control information and/or desired broadcast content directly from the base station. The inability of the remote UE device to directly receive the information/content could be because the remote UE device is out of the coverage area of the base station, the remote UE device is located in a cell in which a particular MBMS service of interest is not being broadcasted, the remote UE device needs to conserve power and cannot continue to monitor the SC-PTM control information until the service of interest becomes available, or the remote UE device does not have the circuitry required to receive the information/content directly from the base station. Regardless of the reason for relaying information to the remote UE device, there are two general relaying scenarios that are covered by the examples described herein. In the first scenario, it is assumed that the remote UE device is the decision maker for how it wants to receive the broadcasted content information. In the second scenario, the relay UE device decides how the broadcasted content information will be delivered to the remote UE device. Thus, for the second scenario, the relay UE device does not need to provide the SC-PTM control information to the remote UE device. Each of the two scenarios are described more fully below.

Figure 3:
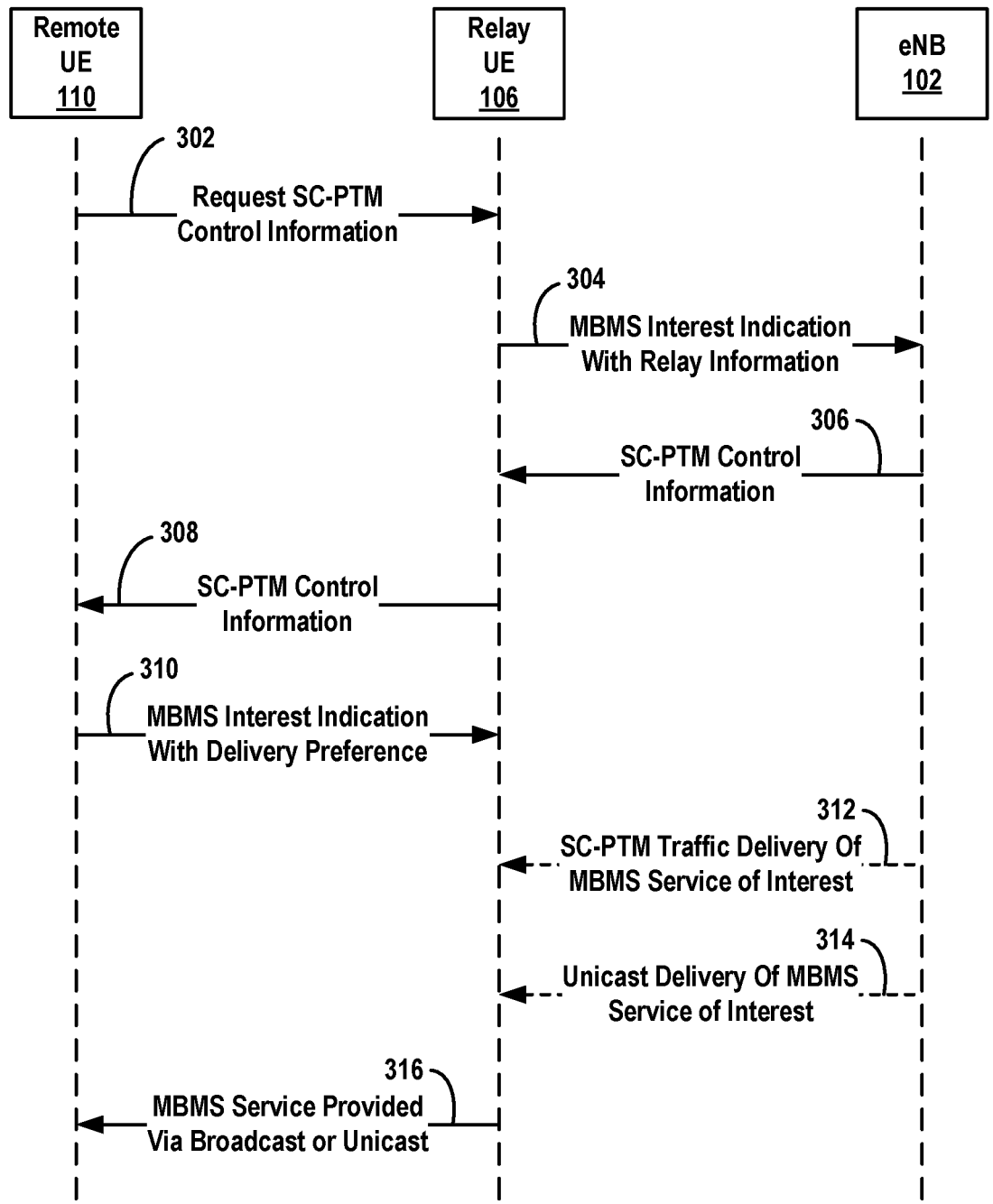
FIG. 3 is a messaging diagram of an example in which the remote UE device determines how the broadcast/multicast information should be delivered to the remote UE device.

Turning now to the first scenario, FIG. 3 is a messaging diagram of an example in which the remote UE device determines how the broadcast/multicast information should be delivered to the remote UE device. FIG. 3 depicts the control messages that are transmitted between the remote UE device, the relay UE device, and the base station for the first scenario. In the interest of clarity and brevity, not all of the messages that are transmitted between the UE devices and the base station are included in FIG. 3. Moreover, one or more of the messages that are shown in FIG. 3 may be omitted. Likewise, additional messages may be included beyond those shown in FIG. 3 that facilitate the relaying of information to the remote UE device and/or the base station.

Initially, the remote UE device 110 determines whether it wants to receive broadcast/multicast delivery via SC-PTM. In some cases, the remote UE device 110 may want to check what is currently being broadcasted by the base station 102. In other cases, the remote UE device 110 may already have access to an application layer program guide of what is being broadcasted by the base station 102. However, the program guide may not be up-to-date, or the congestion condition in the eNB may be such that the scheduled MBMS service cannot be broadcasted.

Once the remote UE device 110 determines that it wants to receive broadcast/multicast delivery via SC-PTM, the remote UE device 110 transmits a request to the relay UE device 106 for SC-PTM control information provided by the base station 102. The remote UE device 110 transmits the request using its transmitter 218 and antenna 212, and the relay UE device 106 receives the request via its antenna 212 and receiver 214. For the example of FIG. 3, it is assumed that the remote UE device 110 is outside of the service area 103 of the base station 102 and/or does not have the circuitry/configuration required to receive the SC-PTM control information directly from the base station 102. The signal containing the request for SC-PTM control information is represented in FIG. 3 by signal 302.

Upon receipt of the request for SC-PTM control information from the remote UE device 110, the relay UE device 106 determines whether the relay UE device 106 can support the request. One reason that the relay UE device 106 may not be able to support the request is that the SC-PTM control information may not be available to the relay UE device 106 (e.g., due to the location and/or operating frequency of the relay UE device 106). For example, SC-PTM control information may only be broadcasted in cells where SC-PTM traffic will be transmitted, and the relay UE device 106 may not be located in a cell where SC-PTM control information will be transmitted. Alternatively, the relay UE device 106 may not configured to receive signals on the frequency on which the SC-PTM control information is being transmitted. Another reason that the relay UE device 106 may not be able to support the request is that the relay UE device 106 may already be performing Unicast functionality of its own. In this case, if the relay UE device 106 were to begin relaying SC-PTM traffic for the remote UE device 110, the base station 102 serving the relay UE device 106 may hand over the relay UE device 106 to another cell where network congestion may be higher or the signal strength may be inferior to the current cell.

If the relay UE device 106 decides to assist the remote UE device 110, the relay UE device 106 transmits an MBMS Interest Indication message, which includes information that indicates that the relay UE device 106 is operating in a relay mode, to the base station 102. In some examples, the MBMS Interest Indication message is based on a Radio Resource Control (RRC) state (e.g., mode) of the relay UE device 106, as will be discussed more fully below. The relay UE device 106 transmits the MBMS Interest Indication message with transmitter 218 and antenna 212, and the base station 102 receives the message with antenna 210 and receiver 208. The signal containing this MBMS Interest Indication message is represented in FIG. 3 by signal 304.

The information that indicates that the relay UE device 106 is operating in a relay mode (e.g., "relay information") is needed since Further Enhanced Machine Type Communication (FeMTC) UE devices can only receive SC-PTM delivery while in Radio Resource Control (RRC) IDLE mode (e.g., state). By informing the base station 102 that the FeMTC UE device is acting as a relay UE device 106 attempting to obtain SC-PTM information on behalf of the remote UE device 110, the base station 102 can decide whether to release the relay UE device 106 to IDLE mode. In some cases, if the relay UE device 106 does not have active traffic, the base station 102 may decide to release the relay UE device 106 to IDLE mode even before the inactivity timer expires. In other cases, if the relay UE device 106 has active ongoing traffic, the base station 102 has the option to provide the SC-PTM control information to the relay UE device 106 via Unicast delivery and in turn to the remote UE device 110, also with Unicast delivery. For non-FeMTC UE devices, it would still be possible for relay UE device 106 to obtain the SC-PTM control information regardless of whether the relay UE device 106 is in IDLE mode or in an RRC CONNECTED mode (e.g., state). In case none of the above options are available to the relay UE device 106, the relay UE device 106 could inform the remote UE device 110 that the relay UE device 106 cannot support relaying of SC-PTM information at this time. The remote UE device 110 has the option to search for an alternate relay UE device, if available.

Upon receipt of the MBMS Interest Indication message, the base station 102 will typically either (1) provide the SC-PTM control information to the relay UE device 106, or (2) handover the relay UE device 106 to a cell (e.g., maybe on a different frequency layer) where SC-PTM control information is provided, if the cell serving the relay UE device 106 cannot provide the SC-PTM control information. In some examples, the SC-PTM control information may be obtained from one or more of the following: System Information Blocks (e.g., SIB 3, SIB 15, SIB 20) and/or the Single-Cell Multicast Control Channel (SC-MCCH). Regardless of which cell transmits the SC-PTM control information, the relay UE device 106 receives the SC-PTM control information using antenna 212 and receiver 214. The signal containing the SC-PTM control information being transmitted from the base station 102 to the relay UE device 106 is represented in FIG. 3 by signal 306.

The relay UE device 106 transmits, using its transmitter 218 and antenna 212, the SC-PTM control information to the remote UE device 110. The remote UE device 110 receives the SC-PTM control information using its antenna 212 and receiver 214. The SC-PTM control information may be delivered using broadcast or unicast over the PC5 link, which is the communication link 114 between relay UE device 106 and remote UE device 110. As mentioned previously, the link between relay UE device 106 and remote UE device 110 is a 3GPP D2D communication link. In other cases, the link between relay UE device 106 and remote UE device 110 can be a non-3GPP D2D communication link (e.g., Bluetooth or Wi-Fi). In cases where there are multiple remote UE devices 108, 110 requesting the same SC-PTM control information, it may be more efficient for the relay UE device 106 to broadcast the SC-PTM control information. The signal containing the SC-PTM control information being transmitted from the relay UE device 106 to the remote UE device 110 is represented in FIG. 3 by signal 308.

Upon receipt of the SC-PTM control information, the remote UE device 110 determines whether one or more MBMS services of interest are available via SC-PTM from the serving cell. Once this determination is made by the remote UE device 110, the remote UE device 110 transmits an MBMS Interest Indication message, which identifies at least one MBMS service of interest and includes a delivery preference, to the relay UE device 106. The "delivery preference" indicates whether the remote UE device 110 prefers to have the MBMS service of interest provided via broadcast (e.g., SC-PTM) delivery or Unicast delivery. If the MBMS service of interest is not critical, the remote UE device 110 may decide not to ask the relay UE device 106 to obtain the MBMS service of interest via Unicast since Unicast delivery adds to the network load. If the MBMS service of interest is critical, the remote UE device 110 would request the relay UE device 106 to obtain the MBMS service of interest via Unicast. The remote UE device 110 transmits this MBMS Interest Indication message via its transmitter 218 and antenna 212, and the relay UE device 106 receives the message via its antenna 212 and receiver 214. The signal containing this MBMS Interest Indication message is represented in FIG. 3 by signal 310.

In response to receiving the MBMS Interest Indication message 310 from the remote UE device 110, the relay UE device 106 requests the service of interest from the base station 102 via the delivery preference indicated in the MBMS Interest Indication message 310, if possible. The signal containing the request is not explicitly shown in FIG. 3. In response to the request from the relay UE device 106, the base station 102 provides the MBMS service of interest via SC-PTM traffic delivery, if SC-PTM delivery was requested by the remote UE device 110. The base station 102 broadcasts the SC-PTM traffic via transmitter 206 and antenna 210. In some cases, the MBMS service of interest is already on-going over SC-PTM, and in these cases, the relay UE device 106 may obtain the broadcasted SC-PTM transmissions without explicitly sending a request to the base station 102. The broadcast signal containing the MBMS service of interest is represented by dashed signal line 312 in FIG. 3. The dashed signal line is intended to indicate that this is one type of delivery that may be used to deliver the requested service of interest.

If the relay UE device 106 requested Unicast delivery, on behalf of the remote UE device 110 when SC-PTM transmission is presently unavailable, then the base station 102 may provide the service of interest via Unicast traffic delivery. The base station 102 transmits the Unicast traffic via transmitter 206 and antenna 210. The Unicast signal containing the MBMS service of interest is represented by dashed signal line 314 in FIG. 3. As mentioned previously, the dashed signal line is intended to indicate that this is one type of delivery that may be used to deliver the requested service of interest.

Regardless of the manner of delivery, base station 102 transmits the service of interest via transmitter 206 and antenna 210, and relay UE device 106 receives the signals containing the service of interest via antenna 212 and receiver 214. Upon receipt of the signals containing the service of interest, the relay UE device 106 transmits the MBMS traffic to the remote UE device 110 with either broadcast delivery or Unicast delivery. The relay UE device 106 determines which delivery method to use based on the delivery preference requested by the remote UE device 110. The relay UE device 106 transmits this MBMS service of interest via its transmitter 218 and antenna 212, and the remote UE device 110 receives the service of interest via its antenna 212 and receiver 214. The signals containing this MBMS service of interest are represented in FIG. 3 by signals 316.

Figure 4:
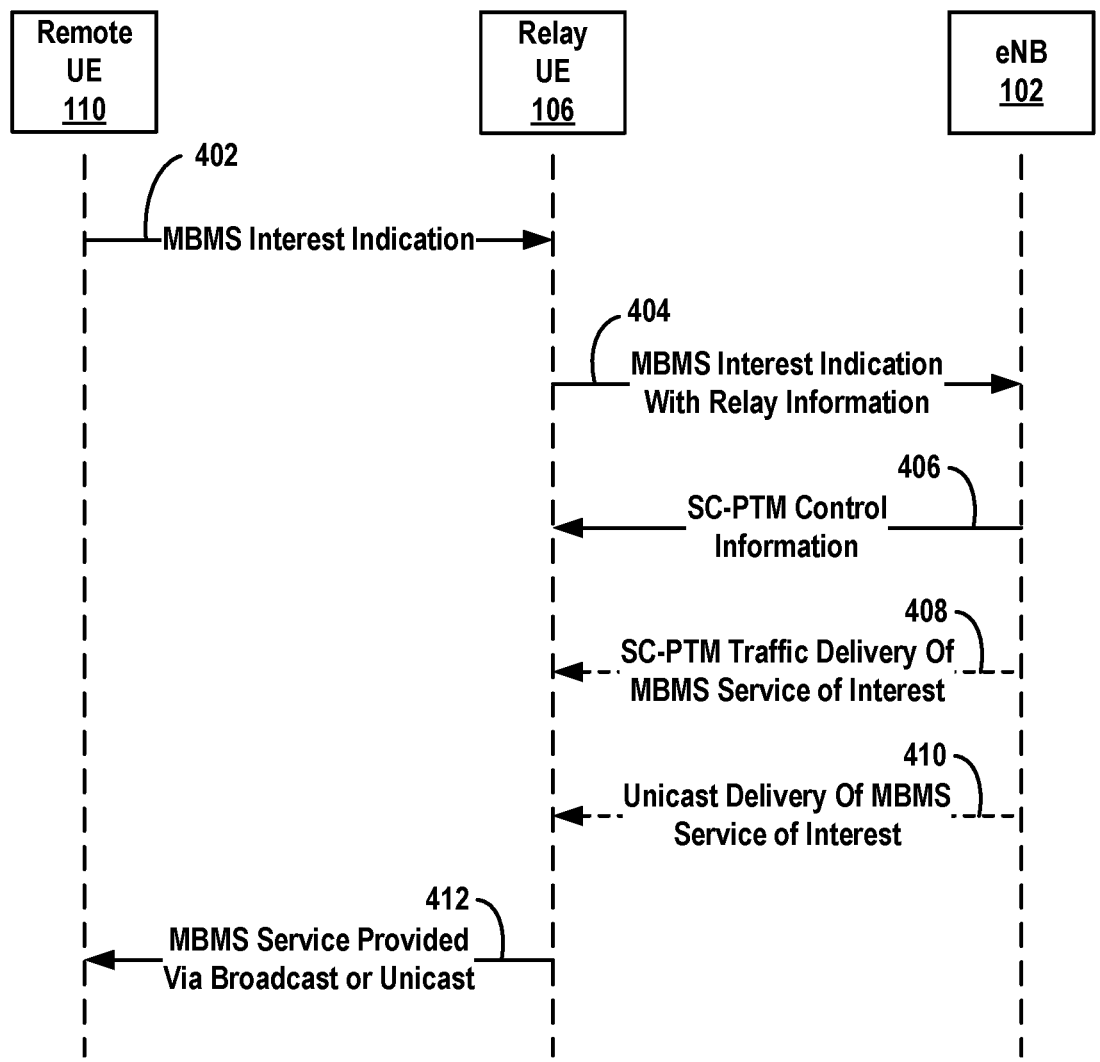
FIG. 4 is a messaging diagram of an example in which the relay UE device determines how the broadcast/multicast information should be delivered to the remote UE device.

Turning now to the second scenario, FIG. 4 shows a messaging diagram of an example in which the relay UE device determines how the broadcast/multicast information should be delivered to the remote UE device. The main difference between the second scenario (FIG. 4) and the first scenario (FIG. 3) is that the relay UE device 106 does not need to provide the SC-PTM control information to the remote UE device 110. This assumes the remote UE device 110 already knows, through the application layer, which MBMS services of interest may be provided by the serving cell.

Similar to the first scenario, the remote UE device 110 initially determines whether it wants to receive broadcast/multicast delivery via SC-PTM. As mentioned above, the remote UE device 110 already has knowledge of what is being broadcasted by the base station 102, via the application layer. Once the remote UE device 110 determines that it wants to receive broadcast/multicast delivery via SC-PTM, the remote UE device 110 transmits an MBMS Interest Indication message, which indicates one or more MBMS services that are of interest to the remote UE device 110, to the relay UE device 106. The remote UE device 110 transmits the MBMS Interest Indication message using its transmitter 218 and antenna 212, and the relay UE device 106 receives the request via its antenna 212 and receiver 214. For the example of FIG. 4, it is assumed that the remote UE device 110 is outside of the service area 103 of the base station 102 and/or does not have the circuitry/configuration required to receive the MBMS service(s) of interest directly from the base station 102. The signal containing the MBMS Interest Indication message is represented in FIG. 4 by signal 402.

In other examples, the remote UE device 110 may not need to transmit the MBMS Interest Indication message 402 since the relay UE device 106 may already know, via the application layer, what services are of interest to the remote UE device 110. Thus, in these cases, the relay UE device 106 can simply provide the SC-PTM traffic for the service(s) that are of interest to the remote UE device 110 whenever they become available. Of course, this would require the relay UE device 106 to monitor the System Information Blocks (e.g., SIB 3, SIB 15, SIB 20) and/or the Single-Cell Multicast Control Channel (SC-MCCH) to determine when the particular MBMS service(s) that are of interest to the remote UE device 110 will be broadcast via SC-PTM.

Upon receipt of the MBMS Interest Indication message from the remote UE device 110, the relay UE device 106 determines whether the relay UE device 106 can support the request. One reason that the relay UE device 106 may not be able to support the request is that the SC-PTM traffic may not be available to the relay UE device 106. For example, the relay UE device 106 may not be located in a cell where SC-PTM traffic will be transmitted. Alternatively, the relay UE device 106 may not configured to receive signals on the frequency on which the SC-PTM traffic is being transmitted. Another reason that the relay UE device 106 may not be able to support the request is that the relay UE device 106 may already be performing Unicast functionality of its own. In this case, if the relay UE device 106 were to begin relaying SC-PTM traffic for the remote UE device 110, the base station 102 serving the relay UE device 106 may handover the relay UE device 106 to another cell where network congestion may be higher or the signal strength may be inferior to the current cell.

If the relay UE device 106 decides to assist the remote UE device 110, the relay UE device 106 transmits an MBMS Interest Indication message, which includes information that indicates that the relay UE device 106 is operating in a relay mode, to the base station 102. The relay UE device 106 transmits the MBMS Interest Indication message with transmitter 218 and antenna 212, and the base station 102 receives the message with antenna 210 and receiver 208. The signal containing the MBMS Interest Indication message is represented in FIG. 4 by signal 404.

The information that indicates that the relay UE device 106 is operating in a relay mode (e.g., "relay information") is needed since Further Enhanced Machine Type Communication (FeMTC) UE devices can only receive SC-PTM delivery while in Radio Resource Control (RRC) IDLE mode (e.g., state). By informing the base station 102 that the FeMTC UE device is acting as a relay UE device 106 attempting to obtain SC-PTM information on behalf of the remote UE device 110, the base station 102 can decide whether to release the relay UE device 106 to IDLE mode. In some cases, if the relay UE device 106 does not have active traffic, the base station 102 may decide to release the relay UE device 106 to IDLE mode even before the inactivity timer expires. In other cases, if the relay UE device 106 has active ongoing traffic, the base station 102 has the option to provide the SC-PTM control information to the relay UE device 106 via Unicast delivery and in turn to the remote UE device 110, also with Unicast delivery. For non-FeMTC UE devices, it would still be possible for relay UE device 106 to obtain the SC-PTM control information regardless of whether the relay UE device 106 is in IDLE mode or in an RRC CONNECTED mode (e.g., state). In case none of the above options are available to the relay UE device 106, the relay UE device 106 could inform the remote UE device 110 that the relay UE device 106 cannot support relaying of SC-PTM information at this time. The remote UE device 110 has the option to search for an alternate relay UE device, if available.

Upon receipt of the MBMS Interest Indication message, the base station 102 will either (1) provide the SC-PTM control information to the relay UE device 106, or (2) handover the relay UE device 106 to a cell (e.g., maybe on a different frequency layer) where SC-PTM control information is provided, if the cell serving the relay UE device 106 cannot provide the SC-PTM control information. In some examples, the SC-PTM control information may be obtained from one or more of the following: System Information Blocks (e.g., SIB 3, SIB 15, SIB 20) and/or the Single-Cell Multicast Control Channel (SC-MCCH). Regardless of which cell transmits the SC-PTM control information, the relay UE device 106 receives the SC-PTM control information using antenna 212 and receiver 214. The signal containing the SC-PTM control information being transmitted from the base station 102 to the relay UE device 106 is represented in FIG. 4 by signal 406.

Upon receipt of the SC-PTM control information, the relay UE device 106 determines whether one or more MBMS services that are of interest to the remote UE device 110 should be provided to the remote UE device 110 via SC-PTM delivery or Unicast delivery. Once this determination is made by the relay UE device 106, the relay UE device 106 can obtain the SC-PTM transmissions from the base station 102 if the SC-PTM transmissions are already ongoing. Otherwise, the relay UE device 106 transmits, to the base station 102, a request for the MBMS service(s) of interest, including the delivery preference selected by the relay UE device 106. The "delivery preference" indicates whether the MBMS service of interest should be provided via broadcast (e.g., SC-PTM) delivery or Unicast delivery. If the MBMS service of interest is not critical, the relay UE device 106 may decide not to ask the base station 102 to provide the MBMS service of interest via Unicast since Unicast delivery adds to the network load. If the MBMS service of interest is critical, the relay UE device 106 would request the base station 102 to provide the MBMS service of interest via Unicast. The relay UE device 106 transmits the request for the MBMS service of interest via its transmitter 218 and antenna 212, and the base station 102 receives the request via its antenna 210 and receiver 208. The signal containing the request is not explicitly shown in FIG. 4.

In response to the request from the relay UE device 106, the base station 102 may provide the MBMS service of interest via SC-PTM traffic delivery, if SC-PTM delivery was requested by the relay UE device 106. However, in some cases, the base station 102 may provide the MBMS service of interest via Unicast delivery (e.g., dashed signal line 410 of FIG. 4) even though SC-PTM delivery was requested. This may occur if there is only one UE device interested in the MBMS service of interest, for example. The base station 102 broadcasts the SC-PTM traffic via transmitter 206 and antenna 210. The broadcast signal containing the MBMS service of interest is represented by dashed signal line 408 in FIG. 4. The dashed line is intended to indicate that this is one type of delivery that may be used to deliver the requested service of interest.

If the relay UE device 106 requested Unicast delivery, then the base station 102 provides the service of interest via Unicast traffic delivery. The base station 102 transmits the Unicast traffic via transmitter 206 and antenna 210. The Unicast signal containing the MBMS service of interest is represented by dashed signal line 410 in FIG. 4. As mentioned previously, the dashed line is intended to indicate that this is one type of delivery that may be used to deliver the requested service of interest.

Regardless of the manner of delivery, base station 102 transmits the service of interest via transmitter 206 and antenna 210, and relay UE device 106 receives the signals containing the service of interest via antenna 212 and receiver 214. Upon receipt of the signals containing the service of interest, the relay UE device 106 transmits the MBMS traffic to the remote UE device 110 with either broadcast delivery or Unicast delivery. The relay UE device 106 determines which delivery method to use based on the delivery preference previously chosen by the relay UE device 106. The relay UE device 106 transmits this MBMS service of interest via its transmitter 218 and antenna 212, and the remote UE device 110 receives the service of interest via its antenna 212 and receiver 214. The signals containing this MBMS service of interest are represented in FIG. 4 by signals 412.

Figure 5:
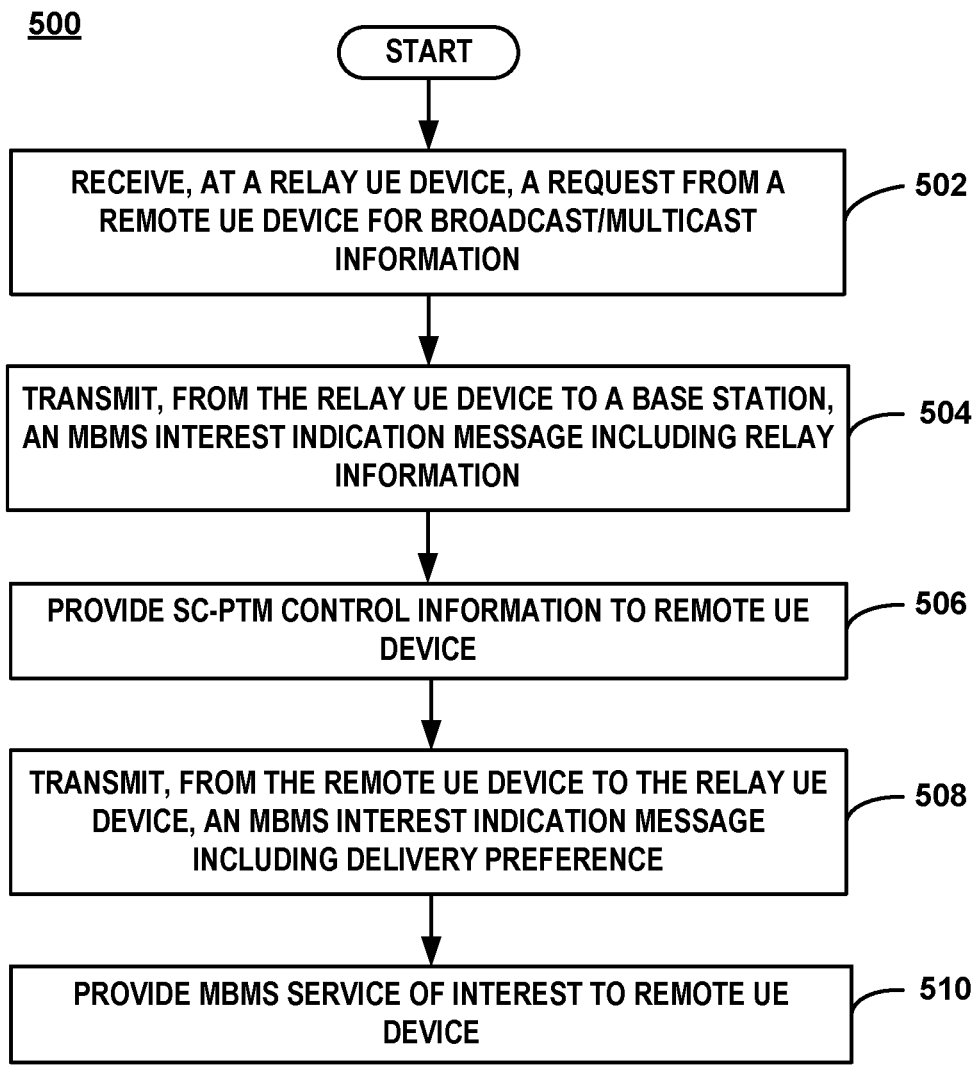
FIG. 5 is a flowchart of an example of a method in which the relay UE device relays broadcast/multicast information to the remote UE device.

FIG. 5 is a flowchart of an example of a method in which the relay UE device relays broadcast/multicast information to the remote UE device. The steps of method 500 may be performed in a different order than described herein and shown in the example of FIG. 5. Furthermore, in some examples, one or more of the steps may be omitted. Moreover, in other examples, one or more additional steps may be added.

In the example shown in FIG. 5, the method 500 begins at step 502, in which the relay UE device 106 receives a request from the remote UE device 110 for broadcast/multicast information. In some cases, the request for broadcast/multicast information comprises a request for Single Cell-Point to Multipoint (SC-PTM) control information, which may include System Information Blocks associated with SC-PTM services and/or Single Cell-Multicast Control Channel (SC-MCCH) information. In cases in which the remote UE device 110 already knows, through the application layer, which MBMS services of interest may be provided by the serving cell, the request for broadcast/multicast information comprises an MBMS Interest Indication message, which indicates one or more MBMS services that are of interest to the remote UE device 110.

At step 504, the relay UE device 106 transmits an MBMS Interest Indication message to the base station 102. This MBMS Interest Indication message includes information that indicates that the relay UE device 106 is operating in a relay mode (e.g., "relay information"). As discussed above, the "relay information" is needed since Further Enhanced Machine Type Communication (FeMTC) UE devices can only receive SC-PTM delivery while in Radio Resource Control (RRC) IDLE mode. By informing the base station 102 that the FeMTC UE device is acting as a relay UE device 106 attempting to obtain SC-PTM information on behalf of the remote UE device 110, the base station 102 can decide whether to release the relay UE device 106 to IDLE mode. In some cases, if the relay UE device 106 does not have active traffic, the base station 102 may decide to release the relay UE device 106 to IDLE mode even before the inactivity timer expires. In other cases, if the relay UE device 106 has active ongoing traffic, the base station 102 has the option to provide the SC-PTM control information to the relay UE device 106 via Unicast delivery and in turn to the remote UE device 110, also with Unicast delivery. For non-FeMTC UE devices, it would still be possible for relay UE device 106 to obtain the SC-PTM control information regardless of whether the relay UE device 106 is in IDLE mode or in an RRC CONNECTED mode (e.g., state). In case none of the above options are available to the relay UE device 106, the relay UE device 106 could inform the remote UE device 110 that the relay UE device 106 cannot support relaying of SC-PTM information at this time. The remote UE device 110 has the option to search for an alternate relay UE device, if available.

At step 506, the base station 102 provides broadcast/multicast information to the remote UE device 110. In the cases in which the remote UE device 110 requests SC-PTM control information at step 502, the base station 102 provides the SC-PTM control information to the remote UE device 110 via relay UE device 106, at step 506.

At step 508, the remote UE device 110 selects an MBMS service of interest based on a manner of delivery of the MBMS service of interest and transmits, to the relay UE device 106, an MBMS Interest Indication message, which includes a delivery preference for an MBMS service of interest. The signal containing this MBMS Interest Indication message is represented in FIG. 3 by signal 310. The "delivery preference" indicates whether the remote UE device 110 prefers to have the MBMS service of interest provided via broadcast (e.g., SC-PTM) delivery or Unicast delivery. If the MBMS service of interest is not critical, the remote UE device 110 may decide not to ask the relay UE device 106 to obtain the MBMS service of interest via Unicast since Unicast delivery adds to the network load. If the MBMS service of interest is critical, the remote UE device 110 would request the relay UE device 106 to obtain the MBMS service of interest via Unicast. Upon receipt of this MBMS Interest Indication message, the relay UE device 106 requests the indicated MBMS service of interest from the base station via the delivery preference specified by the remote UE device 110.

In other cases, the relay UE device 106 determines whether one or more MBMS services that are of interest to the remote UE device 110 should be provided to the remote UE device 110 via SC-PTM delivery or Unicast delivery. Once this determination is made by the relay UE device 106, the relay UE device 106 transmits, to the base station 102, a request for the MBMS service(s) of interest, including the delivery preference selected by the relay UE device 106.

At step 510, the base station 102 provides broadcast/multicast information to the remote UE device 110. More specifically, the base station 102 provides the MBMS service of interest to the remote UE device 110 via the relay UE device 106. The MBMS service of interest can be provided via broadcast delivery or Unicast delivery.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   transmitting, from a relay user equipment (UE) device to a base station, a first Multimedia Broadcast Multicast Service (MBMS) Interest Indication message, the first MBMS Interest Indication message including information that indicates that the relay UE device is operating in a relay mode on behalf of a remote UE device, where the remote UE device is out of a coverage area of the base station;
   providing broadcast/multicast information to the remote UE device, the broadcast/multicast information including Single Cell-Point to Multipoint (SC-PTM) control information; and receiving, at the relay UE device from the remote UE device, a second MBMS Interest Indication message, the second MBMS Interest Indication message including a delivery preference for an MBMS service of interest.

2. The method of claim 1, wherein transmitting the first MBMS Interest Indication message is based on a Radio Resource Control (RRC) state of the relay UE device.

3. The method of claim 1, further comprising:
selecting an MBMS service of interest based on a manner of delivery of the MBMS service of interest.

4. The method of claim 1, wherein providing broadcast/multicast information comprises providing an MBMS service of interest.

5. The method of claim 4, wherein the MBMS service of interest is provided via broadcast delivery.

6. The method of claim 4, wherein the MBMS service of interest is provided via Unicast delivery.

7. The method of claim 1, further comprising:
receiving, at the relay UE device, a request from the remote UE device for broadcast/multicast information.

8. The method of claim 7, wherein the request for broadcast/multicast information comprises a request for Single Cell-Point to Multipoint (SC-PTM) control information.

9. The method of claim 8, wherein the SC-PTM control information comprises System Information Blocks associated with SC-PTM services and Single Cell-Multicast Control Channel (SC-MCCH) information.

10. The method of claim 7, wherein the request for broadcast/multicast information comprises a third MBMS Interest Indication message for an MBMS service of interest.

11. A relay user equipment (UE) device comprising:
a controller;
a transmitter coupled to the controller, the transmitter configured to:
transmit a first Multimedia Broadcast Multicast Service (MBMS) Interest Indication message to a base station, the first MBMS Interest Indication message including information that indicates that the relay UE device is operating in a relay mode on behalf of a remote UE device, where the remote UE device is out of a coverage area of the base station, and
transmit broadcast/multicast information to the remote UE device, the broadcast/multicast information including Single Cell-Point to Multipoint (SC-PTM) control information; and
a receiver configured to receive, from the remote UE device, a second MBMS Interest Indication message, the second MBMS Interest Indication message including a delivery preference for an MBMS service of interest.

12. The relay UE device of claim 11, wherein transmission of the first MBMS Interest Indication message is based on a Radio Resource Control (RRC) state of the relay UE device.

13. The relay UE device of claim 11, wherein the controller is configured to select an MBMS service of interest based on a manner of delivery of the MBMS service of interest.

14. The relay UE device of claim 11, wherein transmission of the broadcast/multicast information comprises transmission of an MBMS service of interest.

15. The relay UE device of claim 14, wherein the MBMS service of interest is provided via broadcast delivery.

16. The relay UE device of claim 14, wherein the MBMS service of interest is provided via Unicast delivery.

17. The relay UE device of claim 11, wherein the relay UE device further comprises:
a receiver configured to receive a request from the remote UE device for broadcast/multicast information.

18. The relay UE device of claim 17, wherein the request for broadcast/multicast information comprises a request for Single Cell-Point to Multipoint (SC-PTM) control information.

19. The relay UE device of claim 18, wherein the SC-PTM control information comprises System Information Blocks associated with SC-PTM services and Single Cell-Multicast Control Channel (SC-MCCH) information.

20. The relay UE device of claim 17, wherein the request for broadcast/multicast information comprises a third MBMS Interest Indication message for an MBMS service of interest.

21. A relay user equipment (UE) device comprising:
a controller;
a transmitter coupled to the controller, the transmitter configured to:
transmit a first Multimedia Broadcast Multicast Service (MBMS) Interest Indication message to a base station, the first MBMS Interest Indication message including information that indicates that the relay UE device is operating in a relay mode on behalf of a remote UE device, where the remote UE device is out of a coverage area of the base station, and
transmit broadcast/multicast information to the remote UE device; and
a receiver configured to receive a request from the remote UE device for broadcast/multicast information, the request for broadcast/multicast information comprising a request for Single Cell-Point to Multipoint (SC-PTM) control information, the SC-PTM control information comprising System Information Blocks associated with SC-PTM services and Single Cell-Multicast Control Channel (SC-MCCH) information.

* * * * *